United States Patent [19]
Takano

[11] Patent Number: 6,100,668
[45] Date of Patent: Aug. 8, 2000

[54] BATTERY CHARGER AND CHARGING METHOD OF SECONDARY BATTERIES

[75] Inventor: Nobuhiro Takano, Hitachinaka, Japan

[73] Assignee: Hitachi Koki Co., Ltd., Tokyo, Japan

[21] Appl. No.: 09/228,269

[22] Filed: Jan. 11, 1999

[30] Foreign Application Priority Data

Jan. 9, 1998 [JP] Japan .................................. 10-002773

[51] Int. Cl.[7] .................................................. H02J 7/00
[52] U.S. Cl. .......................... 320/148; 320/160; 320/125
[58] Field of Search ................................... 320/125, 156, 320/157, 158, 159, 160, 148

[56] References Cited

U.S. PATENT DOCUMENTS

| | | | |
|---|---|---|---|
| 5,550,453 | 8/1996 | Bohne et al. | 320/148 |
| 5,552,693 | 9/1996 | Nishikawa | 320/148 |
| 5,554,920 | 9/1996 | Kokuga | 320/148 |
| 5,621,302 | 4/1997 | Shinohara | 320/148 |
| 5,627,452 | 5/1997 | Okada | 320/148 |

*Primary Examiner*—Peter S. Wong
*Assistant Examiner*—Gregory J. Toatley, Jr

*Attorney, Agent, or Firm*—Sughrue, Mion, Zinn, Macpeak & Seas, PLLC

[57] ABSTRACT

A battery to be charged is preliminary charged with a first charge current. If a presumption can be made such that the battery has reached a fully charged condition before expiration of a first predetermined period of time during which the battery is charged with the first charge current, it is determined that either a fully charged battery or an inactive battery is subject to charging. Then, the battery is preliminary charged with a second charge current. If a fully charged presumption can be made before expiration of a second predetermined period of time during which the battery is charged with the second charge current, it is determined that the battery is already fully charged, whereas if such a presumption cannot be made during the second predetermined period of time, it is determined that the battery is the inactive battery. In the latter case and also in the case where the battery is determined to be an active battery resulting from the determination that a fully charged presumption cannot be made during charging with the first charge current for the first predetermined period of time, the battery is charged with a third charged current until it becomes fully charged.

15 Claims, 5 Drawing Sheets

BATTERY CHARGER AND CHARGING METHOD OF SECONDARY BATTERIES

BACKGROUND OF THE INVENTION

1. Field of the Invention

The present invention relates to a battery charger and also to a charging method of secondary batteries, such as nickel-cadmium batteries.

2. Description of the Related Art

It is essential for battery chargers to determine during a charging process that a battery has reached a fully charged condition. One method of determining the fully charged condition is a "−ΔV detection method", in which the battery is determined to be fully charged when the battery voltage drops a predetermined voltage (ΔV) from the peak level. To this end, the voltage Vi across the battery is detected at every predetermined sampling interval, and whenever the detected battery voltage Vi exceeds the ever occurring maximum voltage, the data recorded as the maximum voltage is updated. When the battery voltage Vi drops a predetermined voltage from the maximum voltage Vmax, the battery is determined to be fully charged. See FIG. 3. Hereinafter, detection of a point where the battery voltage drops a predetermined voltage from the maximum voltage will hereinafter be referred to as "−ΔV detections".

Batteries subject to charging with the charger can be classified into some categories in terms of the use circumstance and residual amount of charges. Specifically, according to one aspect, batteries can be classified into charged ones and discharged ones. Typically, it is a discharged battery that is loaded into the charger for charging. However, fully charged batteries may erroneously be loaded into the charger when the user does not know that the battery has already been fully charged. According to another aspect, the batteries can be classified into active batteries and inactive batteries. Batteries that are normally discharged through the use with electrically powered products are referred to as active batteries. Inactive batteries are such batteries that have been left unused for a long period of time, causing the battery to discharge.

When inactive batteries are charged, the voltage across the battery first drops at the initial stage of charging as shown in FIG. 4. When the −ΔV detection method is applied to the inactive batteries, detection of the fully charged condition cannot be performed correctly because the −ΔV detection method detects the voltage drop appearing at the initial stage of charging and determines that the battery is fully charged at this point. In order to solve this problem, a modified −ΔV detection method has been proposed in which the −ΔV detection is not performed during a predetermined period of time from the start of charging to thus disregard the firstly appearing peak point.

However, this modified −ΔV detection method invites undesirable results when charging a fully charged battery. Notwithstanding the fact that the fully charged battery exhibits a peak to be detected at the initial stage of charging, it is disregarded. As a result, the battery is overcharged and at worst the battery is damaged.

To obviate the problem accompanying the modified −ΔV detection method, an improved −ΔV detection method has been proposed in which a status of the battery is determined based on the battery voltage detected through a provisional charge of the battery and a time duration at which the −ΔV detection is not performed is determined depending upon the status of the battery. However, this improvement is still unsatisfactory in the following respects. First, determination of the status of the battery is complicated. Second, in the case of charging batteries having different number of cells, the status determination may not be performed accurately when each cell does not have an equal capacitance or when one or more of the cells are short-circuited.

SUMMARY OF THE INVENTION

An object of the present invention is to solve the problems of the conventional battery chargers and to provide an improved battery charger and a method of charging secondary batteries capable of accurately detecting a fully charged condition regardless of the status of the battery.

Another object of the present invention is to provide a battery charger and a method of charging secondary batteries capable of classifying the batteries into any one of predetermined categories so that the battery can be properly charged depending on the category to which it belongs.

To achieve the above and other objects, there is provided, according to one aspect of the invention, a battery charger including charge current selecting means for selecting a charge current to be supplied to a battery; battery voltage detecting means for detecting, when the battery is charged with the charge current, a voltage across the battery and outputting a battery voltage signal indicative of the voltage across the battery; full charge presuming means for presuming that the battery has reached a fully charged condition based on the battery voltage signal; and control means for controlling the charge current selecting means to firstly select a first charge current wherein the battery is firstly charged with the first charge current and to thereafter select a second charge current when the full charge presuming means presumes that the battery has reached the fully charged condition before expiration of a first predetermined period of time. With the battery charger as defined above, the battery is determined to be fully charged when the full charge presuming means presumes that the battery has reached the fully charged condition during charging with the second charge current. The battery thus determined to be fully charged is the one that has been substantially fully charged before charging. It should be noted that the first charge current has a first level and the second charge current has a second level lower than the first level. The second level of the second charge current is selected to a value such that a fully charged battery is not overcharged. It should further be noted that charging with the first charge current continues for a duration not exceeding a first predetermined period of time, and charging with the second charge current continues for a duration not exceeding a second predetermined period of time.

After selecting the second charge current, the control means may further select a third charge current when the full charge presuming means does not presume that the battery has reached the fully charged condition before expiration of the second predetermined period of time. In this case, the battery is determined to be fully charged when the full charge presuming means presumes that the battery has reached the fully charged condition during charging with the third charge current. The battery thus determined to be fully charged is an inactive battery. It should be noted that the third charge current has a third level equal to or greater than the first level.

Directly after selecting the first charge current, the control means may select the third charge current when the full charge presuming means does not presume that the battery has reached the fully charged condition during charging with the first charge current. In this case, the battery is determined to be fully charged when the full charge presuming means presumes that the battery has reached the fully charged condition during charging with the third charge current. The battery thus determined to be fully charged is an active battery. The second charge current must be selected to a value that not only a fully charged battery is not overcharged but also the voltage across an inactive battery does not drop when charged with the second charge current.

Another aspect of the present invention provides a method of charging implemented by the battery charger described above.

According to further aspect of the present invention, there is provided a battery charger including: battery voltage detecting means for detecting, when the battery is charged with a charge current, a voltage across the battery and outputting a battery voltage signal indicative of the voltage across the battery; full charge presuming means for presuming that the battery has reached a fully charged condition based on the battery voltage signal; classifying means for classifying the battery into one of a first category, a second category, and a third category; and charging means for charging the battery falling into the second category or the third category. The classifying means includes first preliminary charging means for preliminary charging the battery with a first charge current, second preliminary charging means for preliminary charging the battery with a second charge current, determining means for determining a category into which the battery falls based on presumption made by the full charge presuming means during the preliminary charging by at least the first preliminary charging means. The determining means determines that the battery falls into the first category when the presumption was made during the preliminary charging by both the first preliminary charging means and the second preliminary charging means. The determining means determines that the battery falls into the second category when the presumption was made during the preliminary charging by only the first preliminary charging means. Further, the determining means determines that the battery falls into the third category when no presumption was made during the preliminary charging by the first preliminary charging means. There is further provided charge stopping means for stopping charging the battery when the full charge presuming means presumes that the battery has reached the fully charged condition during charging with the second charge current or the third charge current. The battery falling into the first category is a fully charged battery, the battery falling into the second category is an inactive battery, and the battery falling into the third category is an active battery. The charging means charges the battery falling into the second category or the third category with a third charge current. It should be noted that the first charge current has a first level, the second charge current has a second level lower than the first level, and the third charge current has a third level equal to or greater than the first level. Charging with the first charge current continues for a duration not exceeding the first predetermined period of time and charging with the second charge current continues for a duration not exceeding the second predetermined period of time.

According to the present invention, batteries are prevented from being undercharged or overcharged regardless of what status the batteries are. Further, the fully charged condition of the batteries can be accurately detected.

BRIEF DESCRIPTION OF THE DRAWINGS

The above and other objects, features and advantages of the invention will become more apparent from reading the following description of the preferred embodiment taken in connection with the accompanying drawings in which.

DETAILED DESCRIPTION OF THE PREFERRED EMBODIMENTS

A battery charger according to a preferred embodiment of the present invention will be described while referring to the accompanying drawings.

Figure 1:
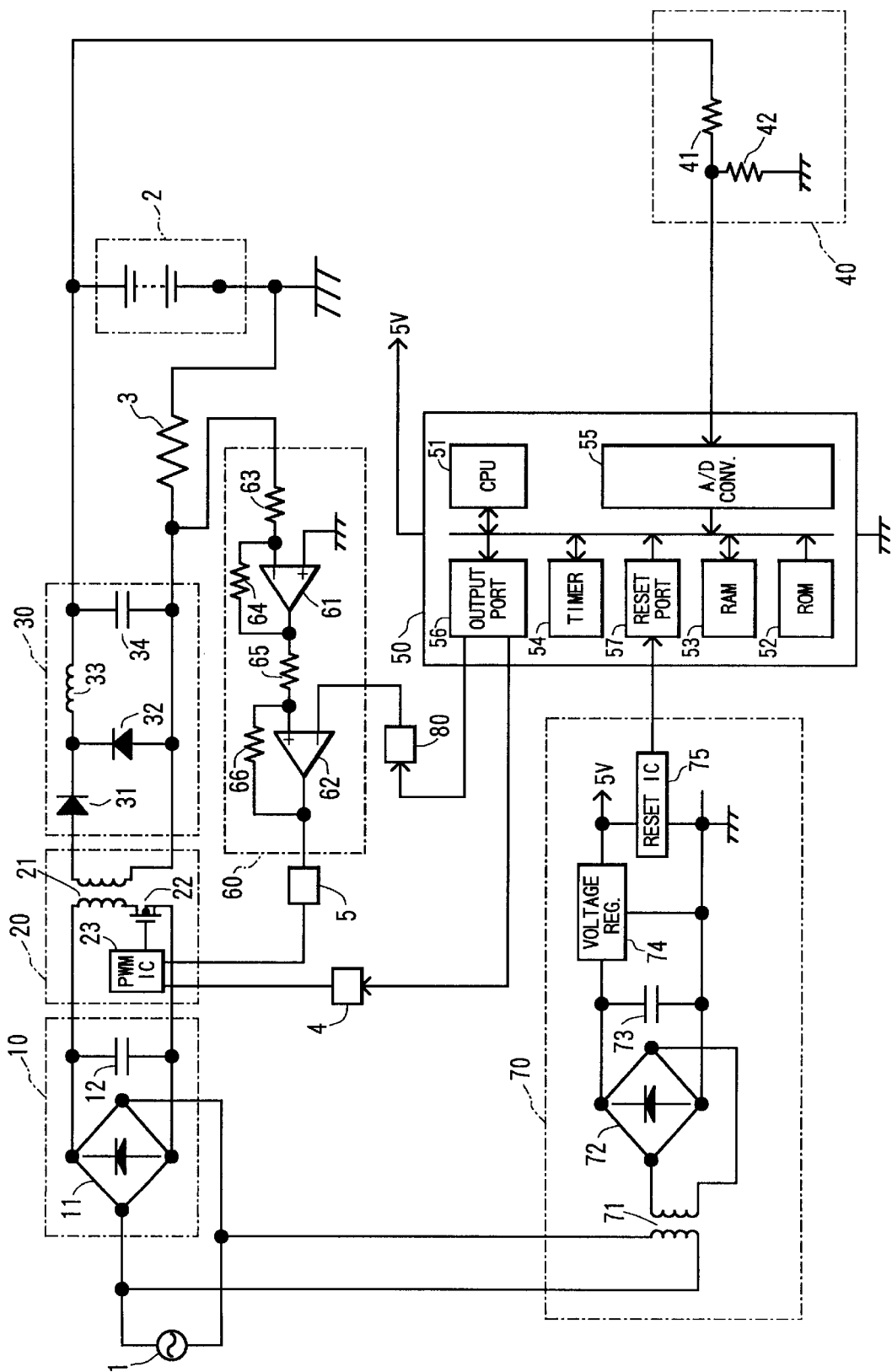
FIG. 1 is a block diagram showing a battery charger according to the present invention.

To charge a battery 2 with the battery charger shown in FIG. 1, the battery 2 is connected between a rectifying/smoothing circuit 30 (to be described later) and ground. The battery 2 consists of a plurality of cells connected in series.

The battery charger includes a resistor 3 serving as a current detection means for detecting a charging current flowing in the battery 2. A rectifying/smoothing circuit 10 is connected to an A.C. power source 1 for converting the A.C. voltage to D.C. voltage. The circuit 10 includes a full-wave rectifier 11 and a smoothing capacitor 12. A switching circuit 20 is connected to the output of the rectifying/smoothing circuit 10 and includes a high frequency transformer 21, a MOSFET 22, and a PWM (pulse width modulation) controlling IC 23. This IC 23 changes the width of driving pulses applied to the MOSFET 22. With the switching actions performed by the MOSFET 22, pulsating voltage is developed at the secondary side of the transformer 21. Another rectifying/smoothing circuit 30 is connected to the output of the switching circuit 20. The circuit 30 includes diodes 31, 32, a choke coil 33, and a smoothing capacitor 34. A battery voltage detection section 40 is connected in parallel to the battery 2 and is made up of two resistors 41 and 42 connected in series so that the voltage across the battery 2 is divided with a ratio of resistances of the two resistors. The output of the battery voltage detection section 40 is taken out from the junction of the resistors 41 and 42.

The battery charger further includes a microcomputer 50 having a CPU 51, a ROM 52, a RAM 53, a timer 54, an A/D converter 55, an output port 56, and a reset input port 57 which are mutually connected by a bus. A charging current control section 60 is connected between the current detection section (resistor) 3 and the switching circuit 20 to maintain the charging current at a predetermined level. The charging current control section 60 includes cascade-connected operational amplifiers 61 and 62, and resistors 63 through 66.

A constant voltage power supply 70 is provided for supplying constant voltages to the microcomputer 50 and the charging current control section 60. The constant voltage power supply 70 includes a transformer 71, a full-wave rectifier 72, a smoothing capacitor 73, a three-terminal voltage regulator 74, and a reset IC 75. The reset IC 75 issues a reset signal to the reset input port 57 of the microcomputer 50 to reset the same. A charge current determining section 80 is connected between the output port 56 of the microcomputer 50 and the inverting input terminal of the cascade-connected operational amplifier 62. The charge current detection section 80 is for setting the charge current by changing the value of voltage applied to the inverting input terminal of the cascade-connected operational amplifier 62 in correspondence to the signal outputted by the microcomputer 50.

A photo-coupler 4 is connected between the output port 56 of the microcomputer 50 and the IC 23 of the switching circuit 20. The photo-coupler 4 is for transmitting from the microcomputer 50 signals for controlling start and stop of charging. Another photo-coupler 5 is connected between output of the cascade-connected operational amplifier 62 of the charge current applying means 60 and the PWM control IC 23. The photo-coupler 5 is for returning the charge current signal to the PWM control IC 23.

Figure 2:
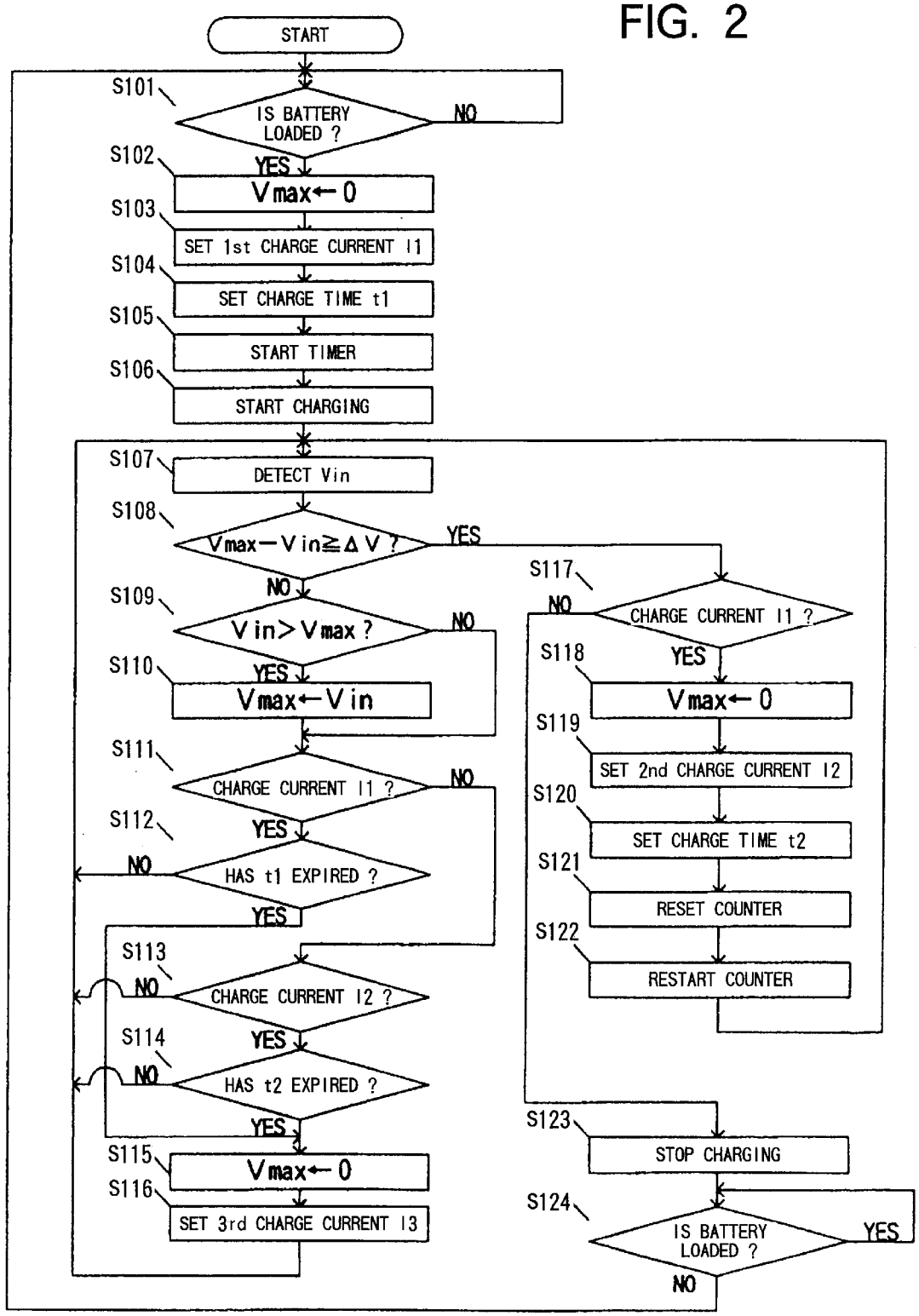
FIG. 2 is a flowchart illustrating operations executed according to the present invention.
Figure 3:
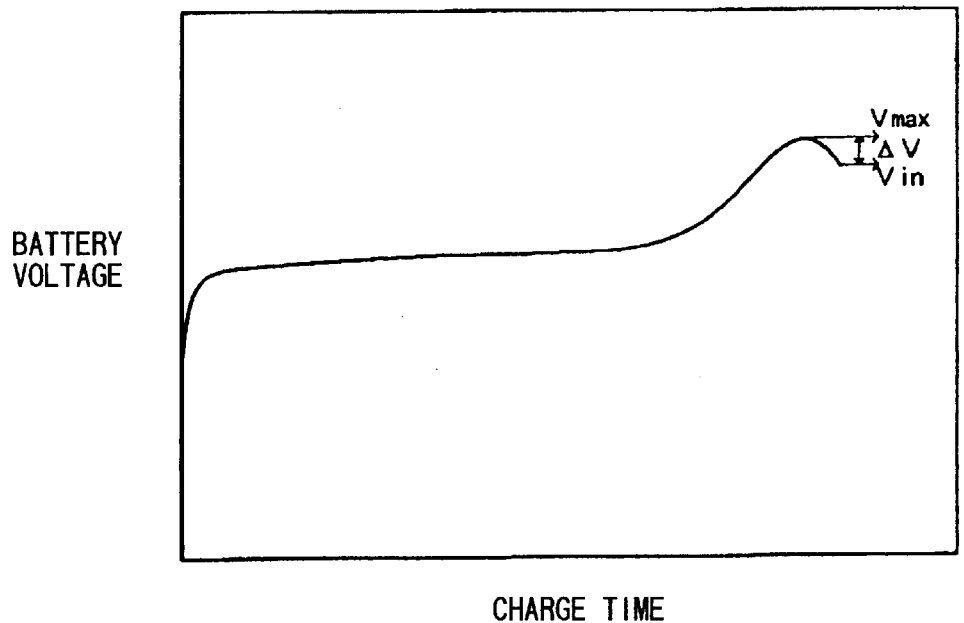
FIG. 3 is a graphical representation showing a charge characteristic curve.

Next, a description of operations of the battery charger will be given while referring to the flowchart shown in FIG. 2. Hereinafter individual steps will be referred to with an "S" followed by the step number.

When power is turned ON, the microcomputer 50 initializes its output port 56 and then goes into a standby condition in which it is determined that the battery 2 is loaded into the charger (S101). When, by referring to the signal outputted from the voltage detection section 40, the microcomputer 50 determines that the battery 2 is loaded (S101: YES), the microcomputer 50 resets the value of a maximum voltage Vmax stored in the RAM 53 (S102). The microcomputer 50 then outputs an instruction from the output port 56 to the charge current determining section 80 so that the first charge current I1 is set in the section 80 (S103). Further, the timer 54 of the microcomputer 50 is set to measure the first charge time t1 during which the battery 2 is charged with the first charge current I1 (S104). The timer 54 starts measuring the first charge time t1 (S105). Concurrent with the start of the timer 54, charging of the battery 2 is started (S106). During charging of the battery 2, an actual charge current flowing through the battery 2 is detected at the resistor 3. A reference voltage corresponding to a target charge current, i.e., the first charge current I1, is subtracted from the voltage corresponding to the actual charge current detected at the resistor 3, and the resultant difference signal is fed back to the PWM control IC 23 via the photo-coupler 5. More specifically, the width of the pulse applied to the high frequency transformer 21 is reduced when the actual charge current is greater than the target charge current whereas the width of the pulse applied to the high frequency transformer 21 is increased when the actual charge current is less than the target charge current. The output from the secondary winding of the high frequency transformer 21 is subjected to rectification and smoothing by the rectifying/smoothing circuit 30. In this way, the charge current is substantially maintained at a predetermined value, i.e., the target charge current.

During charging, whether or not the battery is fully charged is determined by way of the $-\Delta V$ detection method. As the charging of the battery progresses, the battery voltage increases, reaches the peak voltage, and then goes down. According to the $-\Delta V$ detection method, it is determined that the battery is fully charged when after the battery voltage has reached the peak value, a predetermined voltage drop $-\Delta V$ occurred from the peak value. To detect that the battery is fully charged according to the $-\Delta V$ detection method, it is necessary to detect the peak value of the battery voltage. To this end, the updated battery voltage Vin is detected by periodically sampling the output from the battery voltage detecting section 40 and subjecting the detected voltage to analog-to-digital conversion in the A/D converter 55 (S107). The battery voltage Vin thus detected is compared with the maximum voltage Vmax stored in the RAM 53 to determine that the detected battery voltage Vin drops a predetermined voltage $\Delta V$ from the maximum voltage Vmax (S108).

When the determination made in S108 indicates that the detected battery voltage Vin does not drop a predetermined voltage $\Delta V$ from the maximum voltage Vmax (S108: NO), then whether the detected battery voltage Vin is greater than the maximum voltage Vmax is determined (S109). When the comparison made in S109 indicates that the detected battery voltage Vin is greater than the maximum voltage Vmax (S109: YES), the maximum voltage Vmax which has been stored in the RAM 53 is replaced with the detected battery voltage Vin in order to update the value of the maximum voltage Vmax (S110). On the other hand, when the comparison made in S109 indicates that the detected battery voltage Vin is lower than the maximum voltage Vmax (S109: NO), then the routine skips S110 and directly proceeds to S111 where it is determined that the charge current is I1. When the determination made in S111 is affirmative, it is further determined that the first charge time t1 has expired (S112). When the first charge time t1 has not yet expired, the routine goes back to S107 and repeats the processing in S107 through S112.

Figure 4:
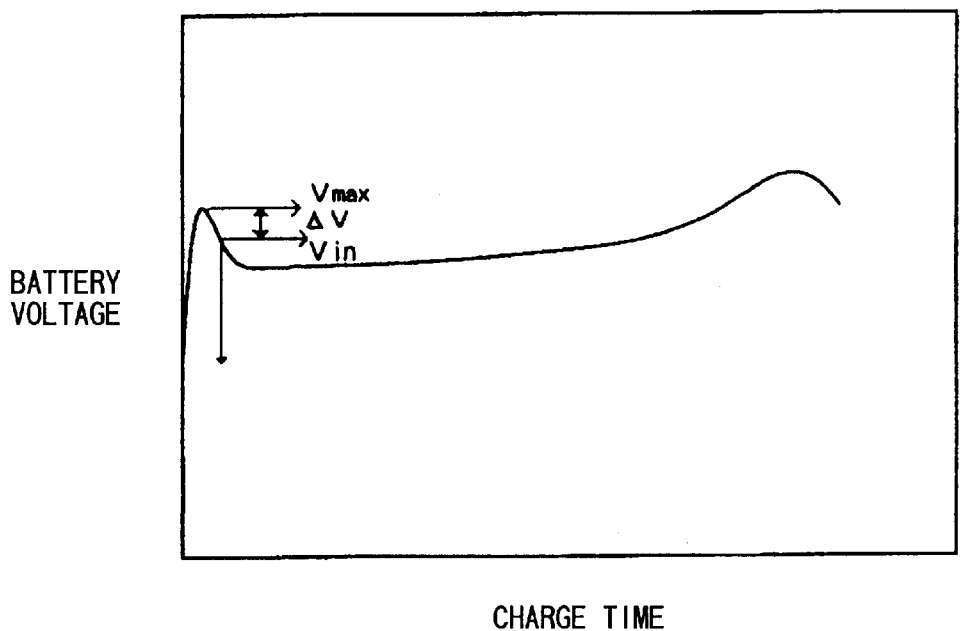
FIG. 4 is a graphical representation showing a charge characteristic curve of an inactive battery charged according to a conventional charging method.
Figure 5:
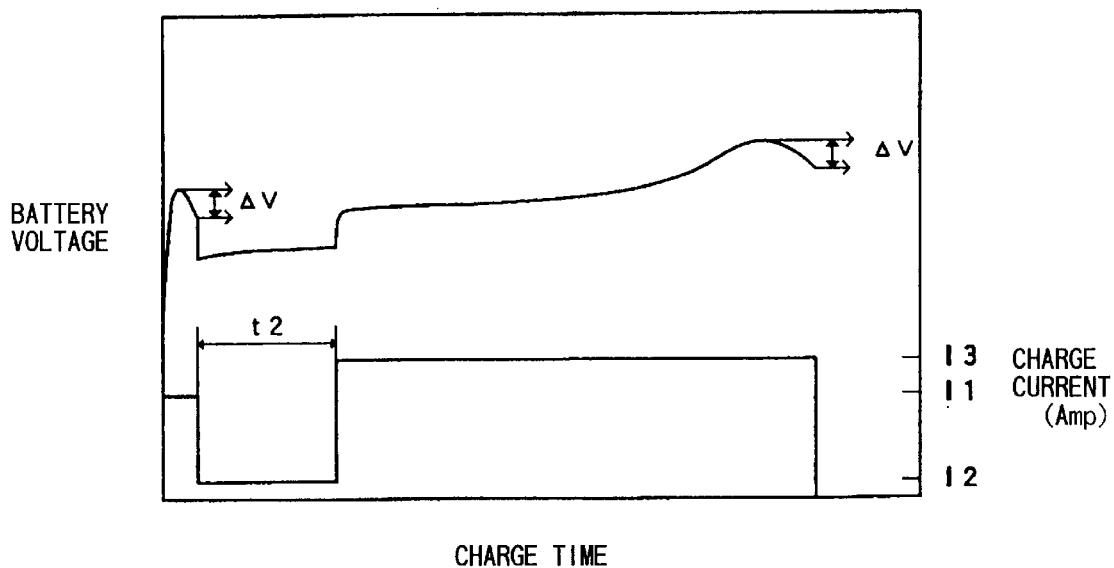
FIG. 5 is a graphical representation showing a charge characteristic curve of an inactive battery charged according to the present invention.
Figure 6:
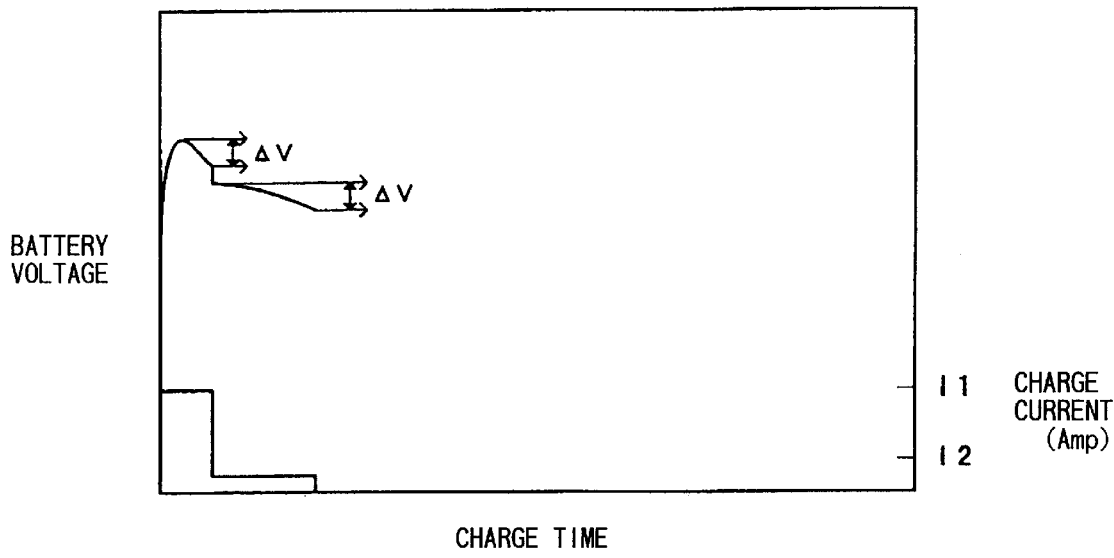
FIG. 6 is a graphical representation showing a charge characteristic curve of a fully charged battery charged according to the present invention.
Figure 7:
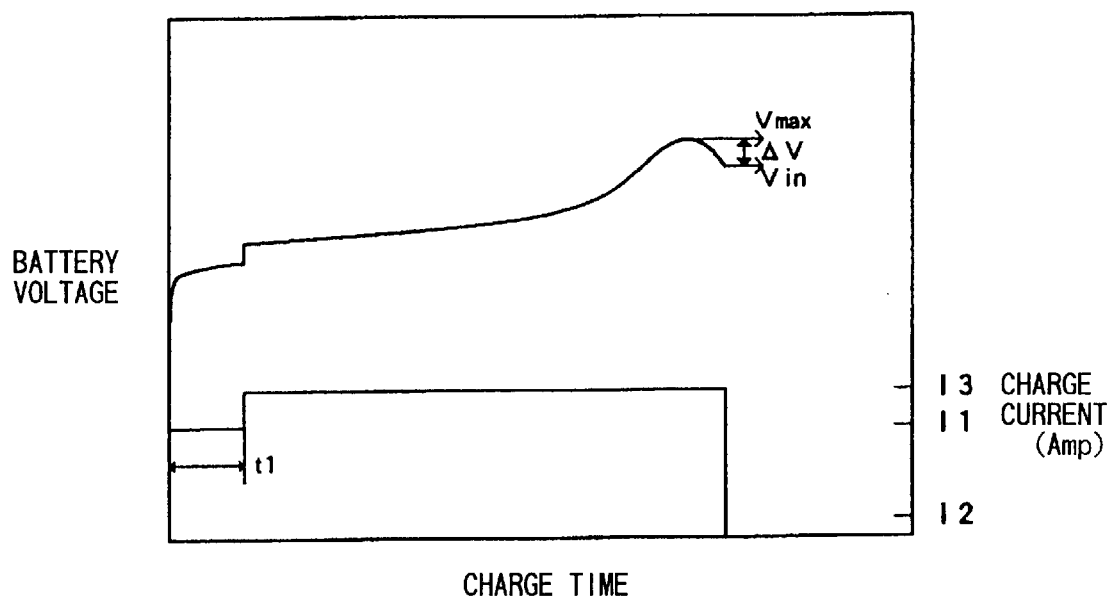
FIG. 7 is a graphical representation showing a charge characteristic curve of an active battery charged according to the present invention.

When determination made in S108 indicates that the detected battery voltage Vin drops a predetermined voltage $\Delta V$ from the maximum voltage Vmax (S108: YES), the charge mode is checked. Specifically, whether the charge current is equal to the first charge current I1 is determined (S117). Charging with the first charge current I1 (S117: YES) corresponds to an initial stage of charging. At this stage, the cause of the $-\Delta V$ detection is not certain, because the $-\Delta V$ detection occurs not only when inactive batteries are charged (see FIG. 4) but also when the batteries that are already fully charged (FIG. 5) are charged. In order to determine which is the case, the maximum voltage Vmax stored in the RAM 53 is again zeroed (S118), and the output port 56 of the microcomputer 51 outputs another charge current setting instruction to the charge current setting section 80 so that the section 80 generates the second charge current I2 lower than the first charge current I1, i.e., I2<I1 (S119). In this way, the charge current is changed. Further, the second charge time t2 is set during which the battery is charged with the second charge current I2 (S120). Upon resetting the timer (S121), the timer is restarted (S122), whereupon the routine returns to S107 and the processing in S107 through 114 are repeatedly executed.

When determination made in S111 indicates that the charge current is not equal to the first charge current I1, it is further determined that the charge current is equal to the second charge current I2 (S113). When determination made in S113 indicates that the charge current is equal to the second charge current I2 (S113: YES), it is further determined that the second charge time t2 as set in S120 has expired (S114). If the second charge time t2 has not yet expired (S114: NO), then the processing in S107–S111, S113 and S114 are repeatedly executed. When $-\Delta V$ detection is performed before expiration of the second charge time t2, the battery 2 is determined to be fully charged. At this time, the charge current is not equal to the first charge current I1

(S117: NO), then the microcomputer 50 issues a charge stop signal to the PWM control IC 23 through the charge control signal transmitting section 4 so that charging is stopped (S123). Next, whether or not the battery 2 has been loaded is determined in S124. If the battery 2 has been removed from the charger (S124: NO), the routine returns to S101, where loading of another battery is awaited.

When the voltage drop $\Delta V$ is not detected in S108 during charging with the second charge current I2 before expiration of the second charge time t2, the battery 2 is determined to be an inactive battery. In this case, the maximum voltage Vmax stored in the RAM 53 is again zeroed (S115), the output port 56 of the microcomputer 50 issues a charge current level setting instruction to the charge current setting section 80 so that the section 80 sets the charge current to a third charge current I3 (S116). The third charge current I3 is greater than the second charge current I2 and is equal to or greater than the first charge current I1. Upon changing the charge current to the third charge current I3, the processing in S107–S111 and S113 are repeatedly executed. When the voltage drop $\Delta V$ is detected in S108 during the repeated execution of S107–S111 and S113, the battery 2 is determined to be fully charged. In this case, the routine returns to S101 upon executing S117, S123 and S124.

When the voltage drop $\Delta V$ is not detected during charging of the battery with the first charge current I1 for the duration of the first charge time t1, the battery 2 is determined to be an active battery. In this case, the maximum voltage Vmax stored in the RAM 53 is again zeroed (S115). The output port 56 of the microcomputer 50 issues a charge level setting instruction to the charge current setting section 80 so that the section 80 sets the third charge current I3 (S116). When the voltage drop $\Delta V$ is detected in S108 through execution of S107 through S111 and S113, the battery 2 is determined to be fully charged. Then, the routine returns to S101 upon executing S117, S123 and S124.

Although specific values for the first to third charge currents are not referred to in the above description, the second charge current I2 must be selected to a value that does not decrease the battery voltage of inactive batteries during charging. Also, the second charge current I2 must be selected to a value such that a fully charged battery is not overcharged. The second charge current I2 must be equal to or lower than 2 Ampere for the nickel-cadmium batteries that can be charged and discharged with a large current. Such batteries are typically used for electrically powered tools, such as an electrical drill. It should be noted that the value of 2 Ampere changes depending upon the number of cells making up the battery. It should further be noted that the value of 2 Ampere must be changed depending upon the sampling interval for sampling the battery voltage. When the sampling interval is set to a relatively long value, the second charge current I2 must be set to a level that does not cause the battery to be overcharged when a fully charged battery is loaded into the charger.

The first and second charge times t1 and t2 must also be selected depending on the kinds of batteries. The first charge time t1 must be selected to have a duration as long as an inactive battery exhibits a voltage dropping characteristic and also the voltage drop $\Delta V$ of the inactive battery can be detected. Typically, when the first charge current is set to 6 Ampere for the nickel-cadmium battery that can be charged with a relatively large current, the first charge time t1 can be set to a duration as long as 2 minutes.

The second charge time t2 must be set to have a duration as long as the voltage drop $\Delta V$ can again be detected when a fully charged battery is further charged with the second charge current I2 following the first charge current I1. Also, the second charge time t2 should not be so long as to lower the voltage of an inactive battery when the charge current is switched from the second charge current I2 to the third charge current I3. It is preferable to set the second charge time t2 to 6 minutes when the second charge current I2 is 2 Ampere for the nickel-cadmium batteries.

While the invention has been described in detail with reference to a specific embodiment thereof, it would be apparent to those skilled in the art that various changes and modifications may be made therein without departing from the spirit of the invention. For example, the fully charged condition of the battery may not be detected by the $-\Delta V$ detection method, but other methods, such as a method of detecting an absolute peak voltage or a peak voltage detecting method using second order differential of the charge characteristic.

What is claimed is:

1. A battery charger comprising:

a charge current selecting section that selects a charge current to be supplied to a battery;

a battery voltage detecting section that detects, when the battery is charged with the charge current, a voltage across the battery and outputting a battery voltage signal indicative of the voltage across the battery;

a full charge presuming section that presumes the battery has reached a fully charged condition based on the battery voltage signal; and a microprocessor operative to control said charge current selecting section to firstly select a first charge current having a first level wherein the battery is firstly charged with the first charge current and to thereafter select a second charge current having a second level lower than the first level when said full charge presuming section presumes that the battery has reached the fully charged condition before expiration of a first predetermined period of time during charging with the first charge current, wherein the battery is determined to be fully charged when said full charge presuming section presumes that the battery has reached the fully charged condition during charging with the second charge current for a second predetermined period of time.

2. The battery charger according to claim 1, wherein the second level of the second charge current is selected to a value such that a fully charged battery is not overcharged.

3. The battery charger according to claim 1, wherein directly after selecting the first charge current, said microprocessor selects a third charge current having a third level equal to or greater than the first level when said full charge presuming section does not presume that the battery has reached the fully charged condition during charging with the first charge current for the first predetermined period of time, wherein the battery is determined to be fully charged when said full charge presuming section presumes that the battery has reached the fully charged condition during charging with the third charge current.

4. The battery charger according to claim 1, wherein after selecting the second charge current, said microprocessor further selects a third charge current having a third level equal to or greater than the first level when said full charge presuming section does not presume that the battery has reached the fully charged condition before expiration of the second predetermined period of time during charging with the second charge current, wherein the battery is determined to be fully charged when said full charge presuming section presumes that the battery has reached the fully charged condition during charging with the third charge current.

5. The battery charger according to claim 4, wherein directly after selecting the first charge current, said microprocessor selects the third charge current when said full charge presuming section does not presume that the battery has reached the fully charged condition during charging with the first charge current for the first predetermined period of time, wherein the battery is determined to be fully charged when said full charge presuming section presumes that the battery has reached the fully charged condition during charging with the third charge current.

6. The battery charger according to claim 5, wherein the second level of the second charge current is selected to a value such that the voltage across an inactive battery does not drop when charged with the second charge current.

7. A method of charging a battery, comprising the steps of:
   (a) selecting a first charge current having a first level wherein a battery is charged with the first charge current; and
   (b) selecting a second charge current having a second level lower than the first level when presumption is made so that the battery has reached a fully charged condition before expiration of a first predetermined period of time during charging with the first charge current,
   wherein the battery is determined to be fully charged when presumption is made so that the battery has reached the fully charged condition during charging with the second charge current for a second predetermined period of time.

8. The method according to claim 7, wherein the second level of the second charge current is selected to a value such that a fully charged battery is not overcharged.

9. The method according to claim 7, further comprising the step of:
   (c1) directly after selecting the first charge current, selecting a third charge current having a third level equal to or greater than the first level when it is not presumed that the battery has reached the fully charged condition during charging with the first charge current for the first predetermined period of time,
   wherein the battery is determined to be fully charged when presumption is made so that the battery has reached the fully charged condition during charging with the third charge current.

10. The method according to claim 7, further comprising the steps of:
    (c2) after step (b), selecting a third charge current having a third level equal to or greater than the first level when it is not presumed that the battery has reached the fully charged condition before expiration of the second predetermined period of time during charging with the second charge current,
    wherein the battery is determined to be fully charged when presumption is made so that the battery has reached the fully charged condition during charging with the third charge current.

11. The method according to claim 10, further comprising the step of:
    (d) directly after selecting the first charge current, selecting the third charge current when it is not presumed that the battery has reached the fully charged condition during charging with the first charge current for the first predetermined period of time,
    wherein the battery is determined to be fully charged when presumption is made so that the battery has reached the fully charged condition during charging with the third charge current.

12. The method according to claim 11, wherein the second level of the second charge current is selected to a value such that a voltage across an inactive battery does not drop when charged with the second charge current.

13. A battery charger comprising:
    a battery voltage detecting section that detects, when the battery is charged with a charge current, a voltage across the battery and outputting a battery voltage signal indicative of the voltage across the battery;
    a full charge presuming section that presumes the battery has reached a fully charged condition based on the battery voltage signal;
    a classifying section operative to classify the battery into one of a first category, a second category, and a third category, said classifying section comprising a first preliminary charging section to preliminarily charge the battery with a first charge current having a first level for a duration not exceeding a first predetermined period of time, a second preliminary charging section to preliminarily charge the battery with a second charge current having a second level lower than the first level for a duration not exceeding a second predetermined period of time, a determining section to determine a category into which the battery falls based on presumption made by said full charge presuming section during the preliminary charging by at least said first preliminary charging section, wherein said determining section determines that the battery falls into the first category when the presumption was made during the preliminary charging by both said first preliminary charging section and the second preliminary charging section, into the second category when the presumption was made during the preliminary charging by only said first preliminary charging section, and into the third category when no presumption was made during the preliminary charging by said first preliminary charging section; and
    a charging section to charge the battery falling into the second category or the third category with a third charge current having a third level equal to or greater than the first level.

14. The battery charger according to claim 13, further comprising a charge stopping unit to stop charging the battery when said full charge presuming section presumes that the battery has reached the fully charged condition during charging with the second charge current or third charge current.

15. The battery charger according to claim 13, wherein the battery falling into the first category is a fully charged battery, the battery falling into the second category is an inactive battery, and the battery falling into the third category is an active battery.

* * * * *